(12) United States Patent
Kanenari et al.

(10) Patent No.: US 9,517,666 B2
(45) Date of Patent: Dec. 13, 2016

(54) VEHICLE WHEEL AND TIRE INFORMATION ACQUISITION DEVICE FITTING

(71) Applicant: THE YOKOHAMA RUBBER CO., LTD., Tokyo (JP)

(72) Inventors: Daisuke Kanenari, Hiratsuka (JP); Yasuhiko Araki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 281 days.

(21) Appl. No.: 14/360,056

(22) PCT Filed: Nov. 16, 2012

(86) PCT No.: PCT/JP2012/007379
§ 371 (c)(1),
(2) Date: May 22, 2014

(87) PCT Pub. No.: WO2013/076946
PCT Pub. Date: May 30, 2013

(65) Prior Publication Data
US 2014/0311232 A1    Oct. 23, 2014

(30) Foreign Application Priority Data

Nov. 22, 2011  (JP) .................................. 2011-254714

(51) Int. Cl.
*B60C 23/04*    (2006.01)
*B60C 29/02*    (2006.01)

(52) U.S. Cl.
CPC ........... *B60C 23/0494* (2013.01); *B60C 29/02* (2013.01)

(58) Field of Classification Search
CPC ............ B60C 23/0408; B60C 23/0491; B60C 23/0494; B60C 29/02
See application file for complete search history.

(56) References Cited

U.S. PATENT DOCUMENTS 5,956,820 A * 9/1999 Albinski ................. B60C 23/04
24/455
7,017,403 B2 * 3/2006 Normann ............ B60C 23/0494
152/152.1

(Continued)

FOREIGN PATENT DOCUMENTS

JP      H08-246116      9/1996
JP      2004-066848     3/2004

(Continued)

OTHER PUBLICATIONS

International Search Report dated Jan. 8, 2013, 4 pages, Japan.

*Primary Examiner* — Kip T Kotter
(74) *Attorney, Agent, or Firm* — Thorpe North & Western

(57) ABSTRACT

A vehicle wheel includes a rim that extends in the wheel circumferential direction, that includes a rim hump formed in a convex form projecting to the outside in the wheel radial direction, and a through hole formed on a rim inclined face that is slanted to an inside in the wheel radial direction on an inside in a wheel width direction from a top of the rim hump. When the tire is fitted, a tire cavity region facing the rim hump is formed. The wheel includes a tire valve fitted to the through hole and a tire information acquisition device installed in the tire cavity region on the tire valve that acquires tire information on the condition of gas filling the tire cavity region. A fitting is provided between the rim inclined face and the tire information acquisition device.

15 Claims, 13 Drawing Sheets

(56) References Cited

U.S. PATENT DOCUMENTS

| | | | |
|---|---|---|---|
| 2004/0034454 A1 | 2/2004 | Ito | |
| 2007/0169545 A1 | 7/2007 | Aoki | |
| 2007/0186637 A1* | 8/2007 | Blossfeld | B60C 23/0494 |
| | | | 73/146.8 |
| 2008/0250852 A1* | 10/2008 | Capdepon | B60C 23/0494 |
| | | | 73/146.8 |
| 2011/0079337 A1* | 4/2011 | Botte | B60C 23/0408 |
| | | | 152/415 |
| 2012/0146392 A1 | 6/2012 | Hamada | |

FOREIGN PATENT DOCUMENTS

| | | |
|---|---|---|
| JP | 2007-191069 | 8/2007 |
| JP | 2008-001222 | 1/2008 |
| JP | 2009-154700 | 7/2009 |
| WO | WO 2011/030405 | 3/2011 |

* cited by examiner

VEHICLE WHEEL AND TIRE INFORMATION ACQUISITION DEVICE FITTING

TECHNICAL FIELD

The present technology relates to a vehicle wheel having a tire information acquisition device for acquiring the condition of the gas filling a tire cavity region as tire information, and a fitting for the tire information acquisition device.

BACKGROUND

Conventionally, inspecting and managing air pressure of tires mounted on vehicles has been desirable from the perspectives of enhancing tire durability, wear resistance, fuel economy, riding comfort, and driving performance. Therefore, various systems for monitoring air pressure of tires have been proposed. Generally, in these systems, air pressure in tires is monitored by acquiring the air pressure information of a tire assembled on a vehicle wheel as tire information, providing a tire information acquisition device for transmitting this tire information in the tire cavity region, and acquiring the tire information of each of a plurality of tires mounted on a vehicle from the tire information acquisition device.

As a specific explanation of a vehicle wheel provided with a tire information acquisition device, for example a tire information acquisition device S is provided on a surface side of a rim R facing the tire cavity region, as shown in FIG. 13A, and a tire valve V is installed penetrating an inclined face of a rim hump R1 with a protruding form formed on the rim R. Also, a tire T is fitted to the surface of the rim R facing the tire cavity region. In such a vehicle wheel, when the tire T is removed from the rim R, the tire T moves along the surface of the rim R in the wheel width direction (the direction of the arrow in FIG. 13A). Here, as shown in FIG. 13B, if after riding over the rim hump R1, the tire T drops into a depression formed at the connection between the tire information acquisition device S and the tire valve V, the tire information acquisition device S is an obstruction on the path of movement of the tire T, in particular the tip portion of the bead portion of the tire T, so the tire information acquisition device obstructs the movement of the tire T. In this case, there was the problem that the tire information acquisition device S is separated from the tire valve V by the excessive force or shock of the impact with the tire T, or is damaged.

For this problem, a tire air pressure sensor fitting structure and tire wheel have been proposed in which the sensor can be removed or damage can be avoided when removing the tire from the rim (Japanese Unexamined Patent Application Publication No. 2007-191069A).

Specifically, a pair of protective members is provided on the rim of the tire wheel to protect the sensor from contact interference with the tire inner peripheral edge when fitting or removing the tire. The pair of protective members is provided sandwiching the sensor in the rim circumferential direction, to prevent contact between the tire and the sensor when fitting or removing the tire.

In the tire air pressure sensor fitting structure and tire wheel disclosed in Japanese Unexamined Patent Application Publication No. 2007-191069A, the protective member is provided integral with the rim, so if for example a tire air pressure monitoring system is constructed using a plurality of tire air pressure sensors each of different size, the positions of the protective members on the rim surface will differ depending on the air pressure sensor. Therefore, it is necessary to carry out a process to change the form of the rim in accordance with the size of the air pressure sensor, in other words it is necessary to separately manufacture the tire wheels, so the versatility of the tire wheel suffers, and the manufacturing cost of the tire wheel could increase.

SUMMARY

The present technology provides a vehicle wheel and tire information acquisition device fitting with a simple configuration that is capable of preventing removal of or damage to the tire information acquisition device due to contact interference with the tire when removing the tire from the rim.

One aspect of the present technology is a vehicle wheel.

The vehicle wheel includes: a rim that includes a rim hump extending in a wheel circumferential direction and formed in a convex form projecting to an outside in a wheel radial direction, and a through hole formed on a rim inclined face that is slanted to an inside in the wheel radial direction on an inside in a wheel width direction from a top of the rim hump, and when a tire is fitted, a tire cavity region is formed between the tire and facing the rim hump;

a tire valve fitted to the through hole;

a tire information acquisition device installed on the tire valve in the tire cavity region, that acquires tire information on the condition of gas filling the tire cavity region; and a fitting provided between the rim inclined face and the tire information acquisition device.

The fitting includes a device contact surface that contacts the tire information acquisition device, the tire information acquisition device includes a fitting contact surface that contacts the fitting, and an outermost end in the wheel radial direction of the device contact surface is provided in a position in the wheel radial direction near to or to the outside of the outermost end of the fitting contact surface.

Preferably, the rim includes a connecting surface connected to the rim inclined face and that is provided on the inside in the wheel width direction with respect to the rim inclined face, and, on the inside in the wheel radial direction with respect to the tire information acquisition device, and the fitting contacts the connecting surface.

Also, preferably, the fitting includes a rim hump contact surface that contacts the rim inclined face, and the outermost end in the wheel radial direction of the rim hump contact surface is provided at a position to the inside in the wheel radial direction of the top of the hump.

Preferably, the fitting includes a first member and a second member on opposite sides in the wheel circumferential direction with reference to the central axis of the through hole, and the first member and the second member are formed extending along the wheel circumferential direction from the opening of the through hole in directions away from each other.

Also, preferably, the first member and the second member are integrally formed.

Preferably, on one of the tire information acquisition device and the fitting, a convex portion is provided projecting towards the other, and a recess portion that engages with the convex portion is provided on the other of the tire information acquisition device and the fitting.

Preferably, the rim complies with ISO 4209-2.

Another aspect of the present technology is a fitting for a tire information acquisition device.

The fitting is provided between a rim formed on a surface that faces a tire cavity region that includes a rim hump extending in a wheel circumferential direction and formed in a convex form projecting to an outside in a wheel radial direction, and a through hole formed on a rim inclined face that is slanted to an inside in the wheel radial direction on an inside in the wheel width direction from a top of the rim hump, and a tire information acquisition device installed in the tire cavity region on a tire valve that is inserted into the through hole, that acquires tire information on the condition of gas filling the tire cavity region.

The fitting includes a device contact surface that contacts the tire information acquisition device.

When the fitting is provided between the rim and the tire information acquisition device, an outermost end in the wheel radial direction of the device contact surface is formed so that it is in a position near or to the outside of the outermost end in the wheel radial direction of a fitting contact surface where the tire information acquisition device contacts the fitting.

The vehicle wheel and tire information acquisition device fitting as described above are capable of preventing removal of or damage to the tire information acquisition device due to contact interference with the tire when removing the tire from the rim, using a simple configuration.

DETAILED DESCRIPTION

The following is a detailed description of the vehicle wheel and tire information acquisition device fitting according to the present technology.

Overview of the Tire Air Pressure Monitoring System

Figure 1:
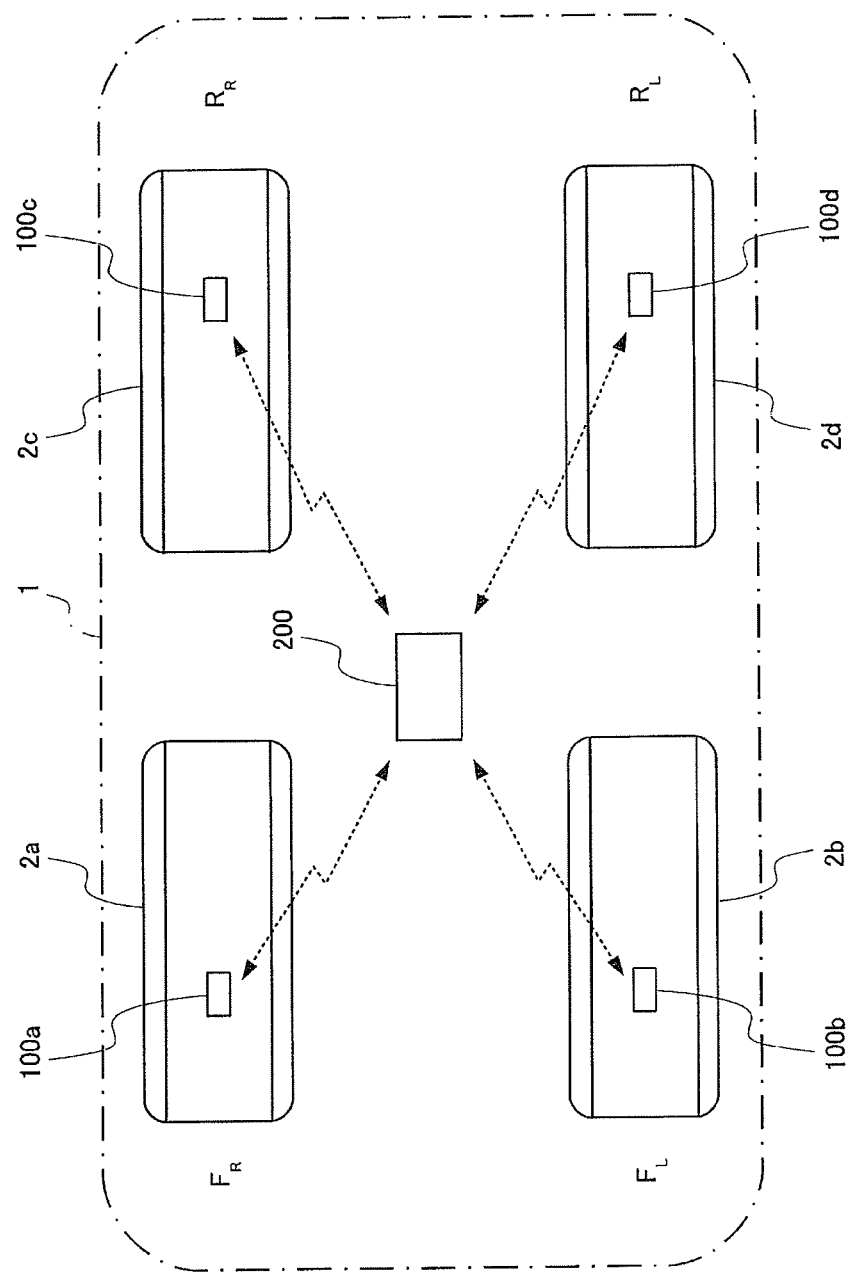
FIG. 1 shows an overall schematic view of a tire air pressure monitoring system.

FIG. 1 shows an overall schematic view of a tire air pressure monitoring system.

The tire air pressure monitoring system (hereinafter referred to as the "system") is installed in a vehicle 1. The system has tire information acquisition devices (hereinafter, referred to as acquisition devices) 100a, 100b, 100c, and 100d provided in a tire cavity region of tires 2a, 2b, 2c, and 2d (when describing the tires 2a, 2b, 2c, and 2d together, the tires 2a, 2b, 2c, and 2d will be referred to collectively as tire 2), respectively, on the vehicle 1, and a monitoring device 200.

Each of the acquisition devices 100a, 100b, 100c, 100d detects the condition of gas filling the tire cavity region enclosed by the tire 2 and a rim 12 (shown in FIG. 2) when the tire 2 is fitted to the rim 12 of a vehicle wheel 10 (shown in FIG. 2) as tire information relating to the condition of the tire, and wirelessly transmits the tire information to the monitoring device 200. When describing all the acquisition devices 100a, 100b, 100c, and 100d together hereinafter, the acquisition devices 100a, 100b, 100c, and 100d will be referred to collectively as the acquisition device 100.

(Configuration of the Vehicle Wheel)

Figure 2:
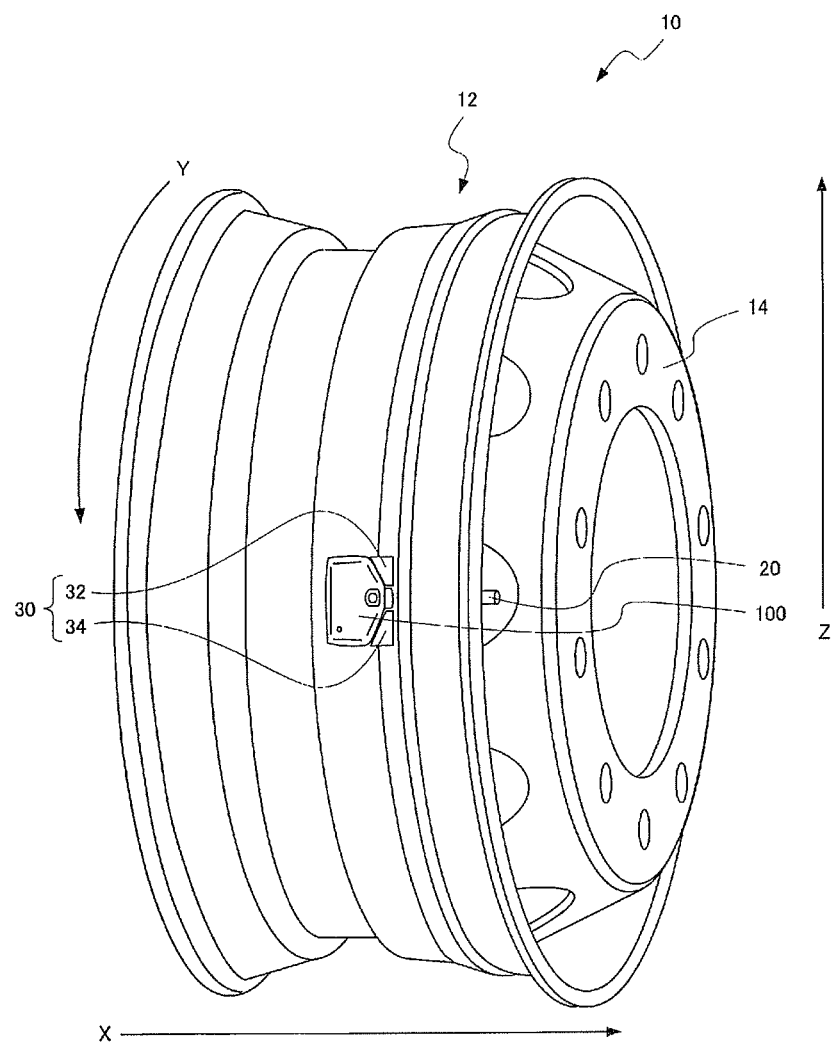
FIG. 2 is an explanatory view of a vehicle wheel according to the present embodiment.
Figure 3:
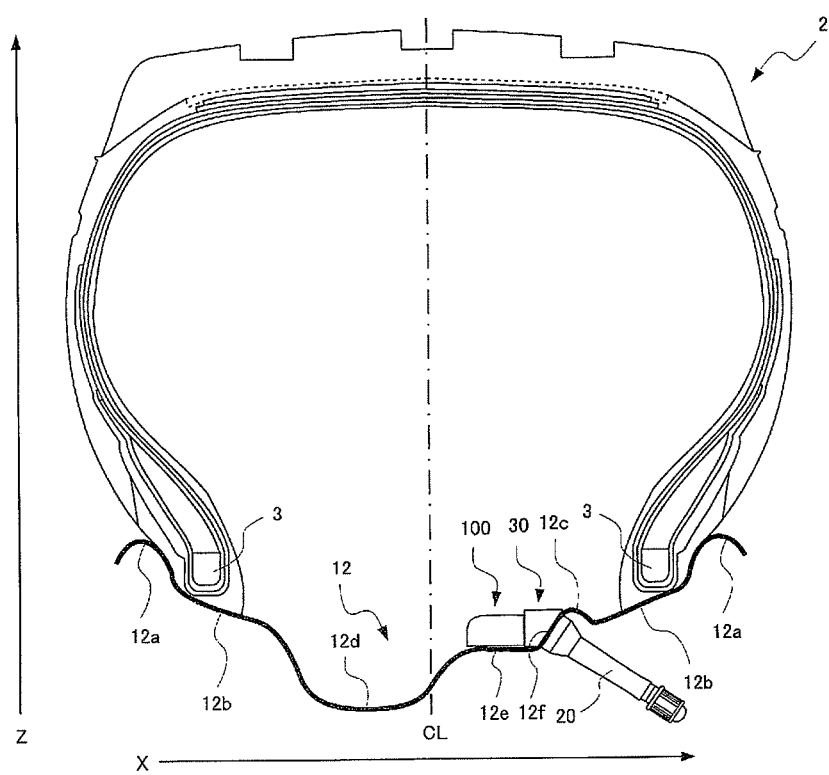
FIG. 3 is a partial cross-sectional view of a tire assembly with a tire fitted to the rim of the vehicle wheel shown in FIG. 2.
Figure 4:
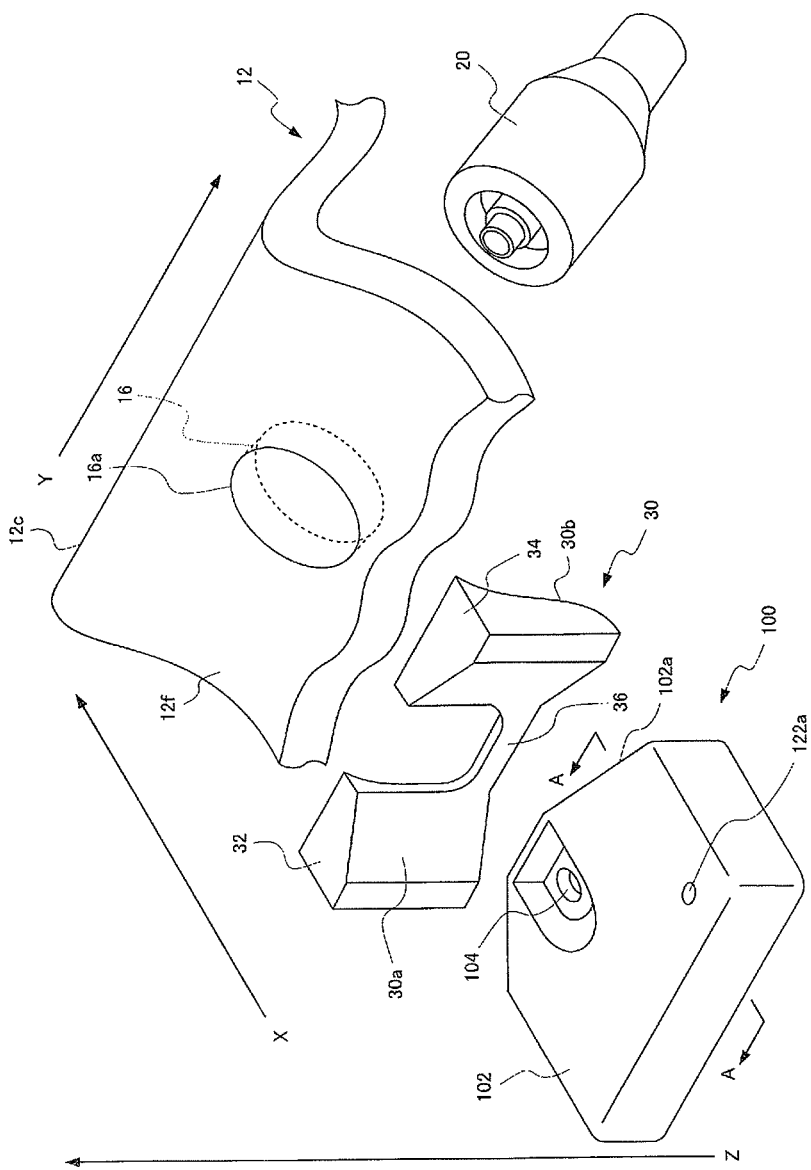
FIG. 4 is a perspective view of equipment provided on the vehicle wheel shown in FIG. 2.

FIG. 2 is an explanatory view of a vehicle wheel according to the present embodiment. FIG. 3 is a partial cross-sectional view of a tire assembly with a tire fitted to the rim of the vehicle wheel shown in FIG. 2. FIG. 4 is a perspective view of equipment provided on the vehicle wheel shown in FIG. 2.

As shown in FIG. 2, the vehicle wheel (hereafter referred to as wheel) 10 according to this embodiment includes the circular cylindrical shaped rim 12 for mounting the tire 2, a disk 14 connected to the inner circumferential surface of the rim 12 for connecting the rim 12 to a hub (not shown on the drawings), a tire valve 20 for venting the tire cavity region and the tire 2 to the atmosphere outside, a fitting 30 for the tire information acquisition device (hereafter referred to as fitting) for installing the acquisition device 100 on the tire valve 20, and an acquisition device 100.

As shown in FIG. 2, the rim 12 is formed on the outer circumferential surface along the wheel circumferential direction (the Y direction in FIG. 2). Also, as shown in FIG. 3, the rim 12 includes a pair of rim flanges 12a, a pair of bead sheets 12b, a rim hump 12c, a well 12d, and a connecting surface 12e.

The pair of rim flanges 12a extend to the outside in the wheel radial direction (the Z direction in FIG. 3) at both ends in the wheel width direction (the X direction in FIG. 3) of the rim 12. The pair of bead sheets 12b are connected to the pair of rim flanges 12a on the center side in the wheel width direction. The rim hump 12c is connected to one bead sheet 12b of the pair of the bead sheets 12b on the center side in the wheel width direction. The well 12d is formed between the other bead sheet 12b of the pair of bead sheets 12b and the rim hump 12c. The connecting surface 12e is formed on the outer circumferential surface of the rim 12 between the rim hump 12c and the well 12d.

The pair of rim flanges 12a, the pair of bead sheets 12b, the rim hump 12c, the well 12d, and the connecting surface 12e are provided each extending in the wheel circumferential direction.

Here, the wheel circumferential direction refers to the rotating direction of the rim 12 when the rim 12 is rotated about the wheel rotational axis. Also, the wheel width direction refers to the direction parallel to the wheel rotational axis, and the center side in the wheel width direction refers to the side that approaches the center line CL of the wheel 10 in the wheel width direction. In addition, the wheel radial direction refers to the direction extending radiating from the wheel rotational axis, and the outside in the wheel radial direction refers to the side in the wheel radial direction away from the wheel rotational axis.

Bead portions 3 of the tire 2 are fitted to the pair of bead sheets 12b. In this way, the tire cavity region is formed between the outer circumferential surface of the rim 12 and the inner circumferential surface of the tire 2, and the outer circumferential surface of the rim 12 is the rim surface that faces the tire cavity region.

The rim hump 12c is formed in protruding form projecting to the outside in the wheel radial direction on the outer circumferential surface of the rim 12. Also, as shown in FIG. 4, the rim hump 12c includes a rim inclined face 12f that is slanted to the inside in the wheel radial direction (opposite to the Z direction side in FIG. 4) from the top of the rim hump 12c towards the inside in the wheel width direction (opposite the X direction side shown in FIG. 4), and an opening 16a of a through hole 16 through which the tire valve 20 penetrates to the tire cavity region is formed in the rim inclined face 12f.

The connecting surface 12e extends in the wheel width direction as shown in FIG. 3, and is formed connected to the rim inclined face 12f of the rim hump 12c. Also, the connecting surface 12e is provided on the inside in the wheel width direction with respect to the rim inclined face 12f, and to the inside in the wheel radial direction with respect to the acquisition device 100.

In the international standard for rims for trucks and buses, ISO 4209-2, it is specified that the opening of the through hole for inserting the tire valve be formed on the rim inclined face that is slanted to the inside in the wheel radial direction on the inside in the wheel width direction from the top of the rim hump, the same as for the rim 12 in this embodiment. Therefore, when the fitting 30 of this embodiment and a rim complying with that standard are used, when removing the tire 2 from the rim 12 as described later, preferably the effect that it is possible to prevent the acquisition device 100 from being removed from the rim 12 or from being damaged by contact interference with the tire 2 can be obtained, using a simple configuration.

The tire valve 20 has a cylindrical form, and is provided penetrating the rim 12 from the outside of the tire 2 towards the tire cavity region. In other words, a portion of a tip side of the tire valve 20 is provided passing through the through hole 16 and projects into the tire cavity region from the opening 16a.

Also, the tire valve 20 is mechanically fixed to the rim 12 so that a portion of the tip side is disposed inside the tire cavity region.

The fitting 30 is configured from resin or the like, for example. As shown in FIG. 4, the fitting 30 has an approximately recessed form having a recess that extends in the wheel width direction (the X direction in FIG. 4) on the surface on the outside in the wheel radial direction (the Z direction in FIG. 4), and is provided interposed between the rim inclined face 12f of the rim hump 12c and the acquisition device 100. The fitting 30 is formed so that it can be attached to and removed from both the acquisition device 100 and the rim hump 12c. The fitting 30 includes a device contact surface 30a on the surface of the fitting 30 facing the acquisition device 100, and a rim hump contact surface 30b that contacts the rim inclined face 12f on the surface of the fitting 30 facing the rim hump 12c. The device contact surface 30a is formed so that it includes a region 30c (shown on FIG. 9) that contacts the acquisition device 100.

Also, the fitting 30 includes a first member 32 and a second member 34 that each extend in the wheel circumferential direction, and an connecting portion 36 that connects the first member 32 and the second member 34 in the wheel circumferential direction. The connecting portion 36 is formed connecting the portions on the inside in the wheel radial direction of the first member 32 and the second member 34. The first member 32, the second member 34, and the connecting portion 36 are integrally formed from the same material. The first member 32 and the second member 34 may be provided separated from each other, but preferably the first member 32, the second member 34, and the connecting portion 36 are provided integrally from the same material from the point of view of ease of fitting and manufacturing efficiency of the fitting 30 by manufacturing the first member 32 and the second member 34 at the same time, to reduce the potential for losing a component when using two or more components, and to reduce the potential of selecting a wrong component when two or more components are selected.

Other details of the fitting 30 are explained later.

(Configuration of the Acquisition Device)

The acquisition device 100 includes an approximately hexagonal prismoidal housing 102 that is disposed inside the tire cavity region, and is provided opposite the rim inclined face 12f in the wheel width direction, with the fitting 30 disposed therebetween. As shown in FIG. 4, the portion of the housing 102 that includes the surface opposite the rim inclined face 12f is formed projecting towards the rim inclined face 12f. A valve installation hole 104 that enables a portion of the tip side of the tire valve 20 that projects into the tire cavity region from the opening 16a of the through hole 16 to be inserted and installed is provided in this projecting portion. Also, the housing 102 includes a fitting contact surface 102a on the surface of the housing 102 that faces the fitting 30. The fitting contact surface 102a is formed including a region (described later) that contacts the fitting 30.

Figure 5:
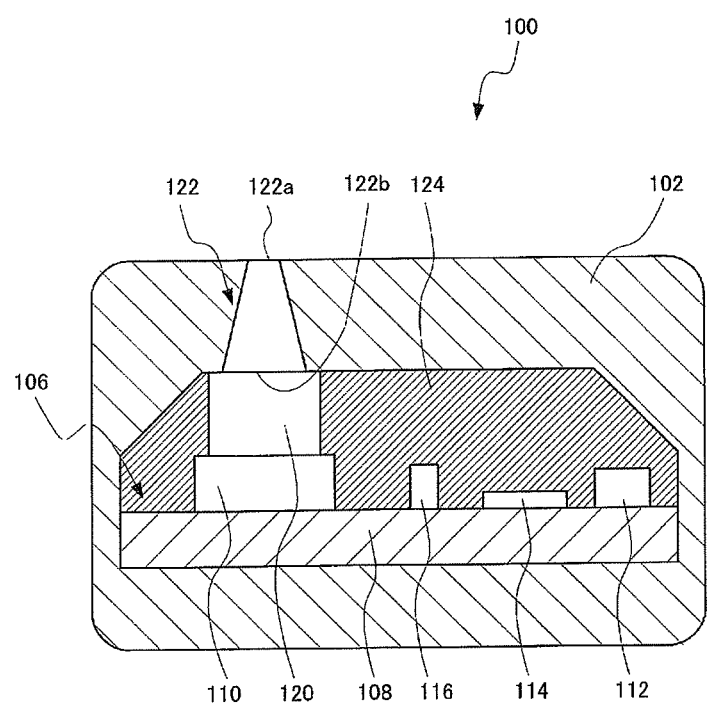
FIG. 5 is a cross-sectional view of a fitting device along the line A-A in FIG. 4.

FIG. 5 is a cross-sectional view of the housing 102 along the line A-A in FIG. 4. As shown in FIG. 5, the housing 102 has a circuit 106 provided inside the housing 102. The circuit 106 has a substrate 108, a sensor unit 110 provided on the substrate 108, a transmitter 112, a processing unit 114, a power supply unit 116, and an antenna 118 (shown in FIG. 6). An internal space 120 is provided inside the housing 102 for containing the circuit 106 in a state of being compartmentalized from the tire cavity region.

The sensor unit 110 is a sensor that detects as tire information the condition of gas filling the tire cavity region. In this embodiment, the sensor unit 110 detects, as tire information, the air pressure of the gas filling the tire cavity region. The sensor unit 110 has a sensor surface for detecting air pressure, and the sensor surface faces the internal space 120.

A ventilation hole 122 that allows communication between the internal space 120 in the housing 102 and the tire cavity region is provided in the housing 102 so as to penetrate the wall of the housing 102. An outside opening part 122a of the ventilation hole 122 is provided in the surface of the housing 102 where the ventilation hole 122 faces the tire cavity region. That is, the outside opening part 122a is provided so as to open toward the outer side in the tire radial direction. Conversely, an inside opening part 122b of the ventilation hole 122 is provided in the surface of the housing 102 where the ventilation hole 122 faces the internal space 120.

The inside region covered by the wall of the housing 102 is filled with a sealing resin 124 as an internal member while maintaining the internal space 120. Specifically, the internal space 120 is compartmentalized from the tire cavity region by the wall surface of the housing 102 and by the inner wall of the internal member provided in the housing 102. The internal space 120 is narrower than the region inside covered by the wall of the housing 102.

While at least one wall surface of the internal space 120 is made by the sealing resin 124, the internal member is not limited to the sealing resin 124. A resin formed in a certain shape may be disposed as the internal member.

Figure 6:
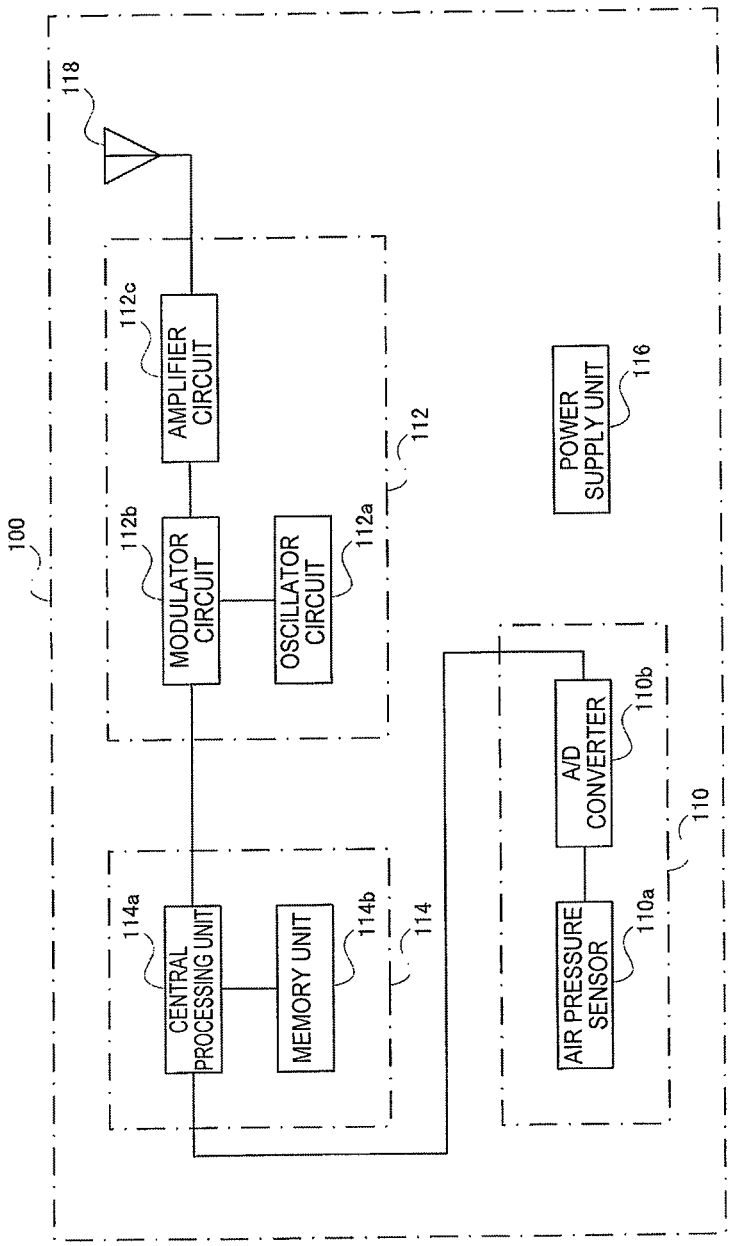
FIG. 6 is a circuit configuration of the acquisition device shown in FIG. 1.

FIG. 6 is a circuit configuration of the acquisition device 100.

The sensor unit 110 has an air pressure sensor 110a and an A/D converter 110b. The air pressure sensor 110a senses the air pressure of the internal space 120 of the housing 102 and outputs the sensed pressure as a pressure signal. Since the internal space 120 communicates with the tire cavity region via the ventilation hole 122, the air pressure sensor 110a is able to sense the air pressure in the tire cavity region.

The A/D converter 110b converts the pressure signal output from the air pressure sensor 110a and outputs a digital pressure datum.

The processing unit 114 includes a central processing unit 114a and a memory unit 114b. The central processing unit 114a operates based on a program stored in semiconductor memory of the memory unit 114b. When the central processing unit 114a is powered and operated, the central processing unit 114a controls so as to transmit the pressure data received from the sensor unit 110 as the air pressure information to the monitoring device 200 via the transmitter 112 at a predetermined time interval such as every five minutes. Identifying information unique to each acquisition device 100 is previously stored in the memory unit 114b, and the central processing unit 114a controls so that the pressure data is transmitted to the monitoring device 200 along with the identifying information.

The memory unit 114b includes read-only memory (ROM) in which the program that operates the central processing unit 114a is stored and rewritable non-volatile memory such as, for example, electrically erasable programmable read-only memory (EEPROM) or the like. The identifying information unique to each acquisition device 100 is stored in a non-rewritable region of the memory unit 114b.

The transmitter 112 includes an oscillator circuit 112a, a modulator circuit 112b, and an amplifier circuit 112c.

The oscillator circuit 112a generates a carrier wave signal, for example, a radio frequency (RF) signal having a frequency in the 315 MHz band.

The modulator circuit 112b uses the pressure data transmitted from the central processing unit 114a and the identifying information unique to the acquisition device 100 to modulate the carrier wave signals and generate a transmission signal. Examples of a modulation method that can be used include amplitude shift keying (ASK), frequency modulation (FM), frequency shift keying (FSK), phase modulation (PM), phase shift keying (PSK), and the like.

The amplifier circuit 112c amplifies the transmission signal generated by the modulator circuit 112b. The amplified transmission signal is transmitted wirelessly through an antenna 118 to the monitoring device 200.

The power supply unit 116 uses a secondary battery, for example, to provide electrical power to the sensor unit 110, the transmitter 112, and the processing unit 114.

(Configuration of the Monitoring Device)

Figure 7:
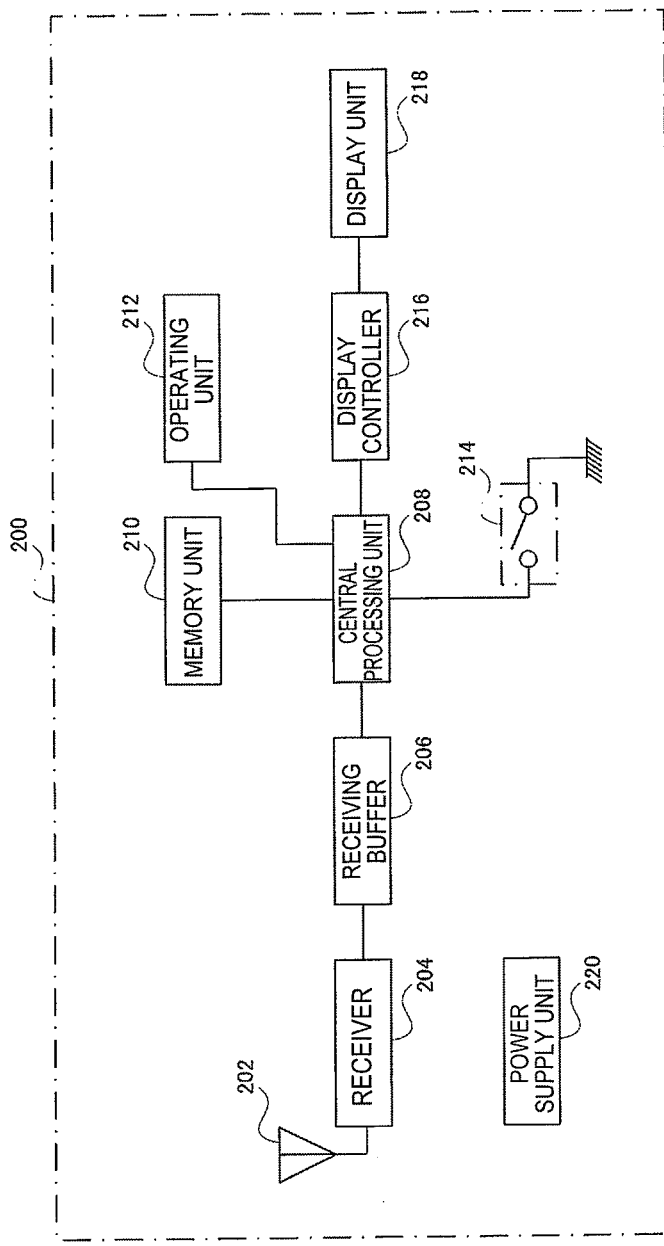
FIG. 7 is a circuit configuration of a monitoring device shown in FIG. 1.

FIG. 7 is a circuit configuration of the monitoring device 200.

The monitoring device 200 is disposed, for example, at the location of the driver's seat in the vehicle 1 and reports air pressure information to the driver. The monitoring device 200 includes an antenna 202, a receiver 204, a receiving buffer 206, a central processing unit 208, a memory unit 210, an operating unit 212, a switch 214, a display controller 216, a display unit 218, and a power supply unit 220.

The antenna 202 is adjusted to a frequency that is the same as the transmission frequency of the acquisition device 100, and is connected to the receiver 204.

The receiver 204 receives the transmission signal at a certain frequency transmitted by the acquisition device 100, conducts demodulation, and extracts data including the pressure data and the identifying information. The data is outputted to the receiving buffer 206.

The receiving buffer 206 temporarily stores the pressure datum and the identifying information datum output from the receiver 204. The stored pressure datum and identifying information datum are output to the central processing unit 208 in accordance with a command from the central processing unit 208.

The central processing unit 208 is primarily constructed of a CPU and operates based on a program stored in the memory unit 210. The central processing unit 208 monitors the air pressure of the tires 2a to 2d for each instance of identifying information based on the received pressure datum and identifying information datum. Specifically, the central processing unit 208 determines the presence or absence of an abnormality of the tires 2a to 2d on the basis of the pressure data, and reports the determination results to the driver. "Determines the presence or absence of abnormalities" means, for example, determining whether the tire has been punctured based on abnormally low air pressure or a sudden decline in air pressure over a short period of time.

The central processing unit 208 outputs the determination results to the display controller 216 and the determination results are displayed on the display unit 218 via the display controller 216.

Moreover, the central processing unit 208 initializes the communication protocol between itself and the acquisition device 100 in response to information from the operating unit 212 and information from the switch 214. The setting of a determination condition for determining the presence or absence of a tire abnormality by the central processing unit 208 may be conducted based on information from the operating unit 212.

The memory unit 210 includes ROM in which the program that operates the CPU of the central processing unit 208 is stored and non-volatile memory such as, for example, EEPROM or the like. A table of communication protocols for communicating with the acquisition device 100 is stored in the memory unit 210 in the manufacturing stage. The acquisition device 100 and the monitoring device 200 communicate in the initial stage with a preset communication protocol. Information such as communication protocols, transfer bit rates, data formats and the like is included in correspondence with the unique identifying information of each of the acquisition devices 100 in the communication protocol table. The information may be freely reset with an input from the operating unit 212.

The operating unit 212 includes an input device such as a keyboard, and is used for inputting various types of information and conditions. The switch 214 is used for instructing the central processing unit 208 to start initialization.

The display controller 216 controls the display unit 218 to display tire air pressure associated with the mounting position of the tires 2a to 2d in accordance with the determination result from the central processing unit 208. The display controller 216 controls the display unit 218 to display the determination result that indicates the tire puncture condition at the same time.

The power supply unit 220 supplies electrical power through a power source line, not illustrated, by controlling the electrical power supplied from a battery mounted in the vehicle 1 at a voltage suitable for each unit of the monitoring device 200.

In this way, the acquisition device 100 and the monitoring device 200 used in the system are configured.

(Wheel Configuration)

Figure 8A:
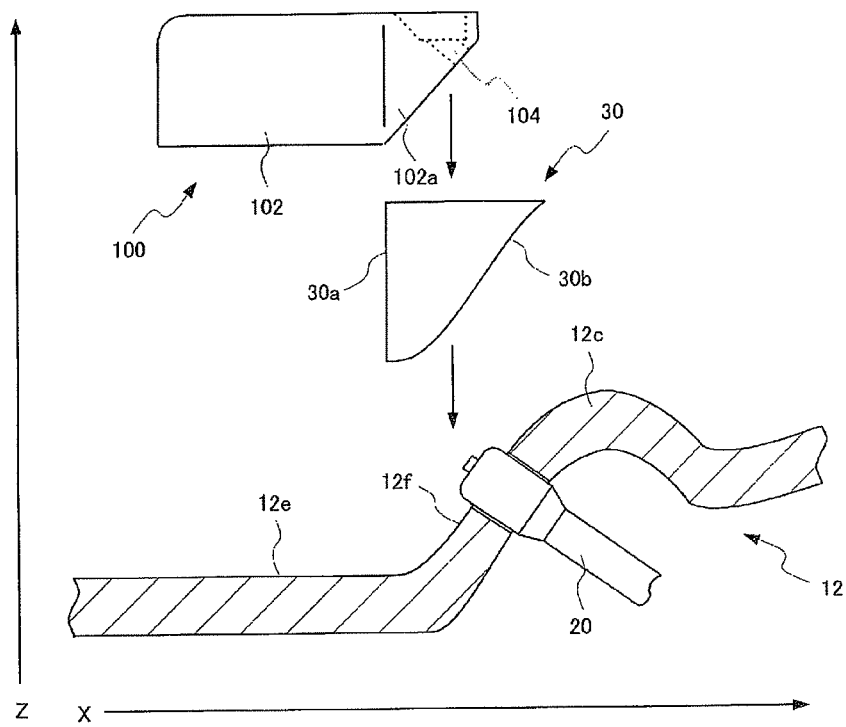
FIGS. 8A and 8B are views showing an example of a method of installing the acquisition device on the tire valve.
Figure 8B:
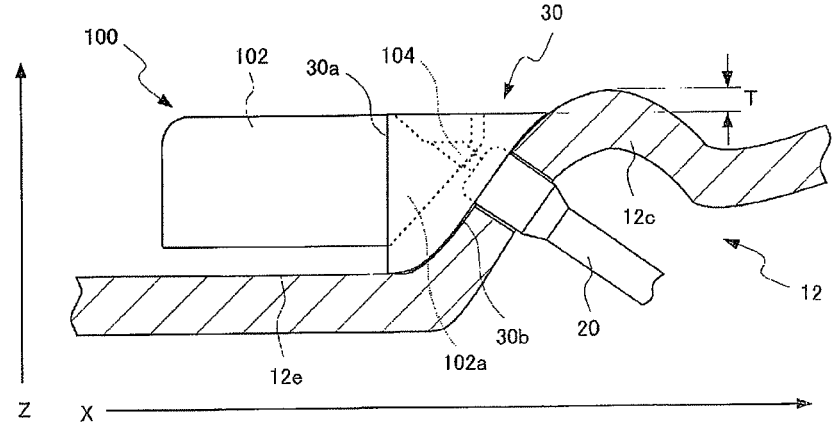

Next, the configuration of the wheel 10 of this embodiment is described in more detail. FIGS. 8A and 8B are views showing an example of a method of installing the acquisition device 100 on the tire valve 20.

As shown in FIG. 8A, the acquisition device 100 is installed on the fitting 30 by inserting the portion of the housing 102 that projects towards the rim inclined face 12f into the recess between the first member 32 and the second member 34 of the fitting 30. Also, the acquisition device 100 is installed on the tire valve 20 by inserting a portion of the tip side of the tire valve 20 into the installation hole 104 of the housing 102 through the recess of the fitting 30.

Here, the relationship between the rim hump contact surface 30b of the fitting 30 and the rim hump 12c is described. As shown in FIG. 8B, when the acquisition device 100 is installed on the tire valve 20 with the fitting 30 therebetween, the outermost end in the radial direction of the wheel of the rim hump contact surface 30b of the fitting 30 is preferably provided inward, in the wheel radial direction, of the top of the rim hump 12c. In other words, the top of the rim hump 12c is in a position separated by a distance T (T>0) to the outside in the wheel radial direction with respect to the outermost end in the wheel radial direction of the rim hump contact surface 30b. For example, if the outermost end in the wheel radial direction of the rim hump contact surface 30b is provided to the outside in the wheel radial direction of the top of the rim hump 12c, the rim hump contact surface 30b projects higher into the movement path of the bead portion 3 of the tire 2 than the rim hump 12c. In this case, the fitting 30 becomes an obstacle to the bead portion 3 on the movement path of the bead portion 3 of the tire 2. Here, when removing the tire 2 from the rim 12, there is a possibility that the fitting 30 and the acquisition device 100 will be separated from the tire valve 20 or damaged by the shock or excessive force received when the fitting 30 and the acquisition device 100 impact the tire 2, due to impact of the bead portion 3 of the tire 2 with the rim hump contact surface 30b.

In this embodiment, by providing the outermost end in the wheel radial direction of the rim hump contact surface 30b inward, in the wheel radial direction, of the top of the rim hump 12c, the rim hump contact surface 30b does not project higher than the rim hump 12c in the movement path of the bead portion 3 of the tire 2. In other words, the fitting 30 is not an obstacle to the bead portion 3 in the movement path of the bead portion 3 of the tire 2. Therefore, when removing the tire 2 from the rim 12, the bead portion 3 of the tire 2 does not impact with the rim hump contact surface 30b, so it is possible to prevent the fitting 30 and the acquisition device 100 from separating from the tire valve 20 or being damaged by the shock or excessive force received due to the fitting 30 and the acquisition device 100 impacting the tire 2.

Also, the bottom surface of the fitting 30, in other words the surface of the fitting 30 on the inside in the wheel radial direction, contacts the connecting surface 12e of the rim 12. In this way, it is possible to stabilize the bottom of the fitting 30, so when, for example upon removing the tire 2 from the rim 12, the bead portion 3 of the tire 2 rides over the fitting 30, it is possible to prevent the fitting 30 from shifting its position due to the load from the tire 2.

Next, the relationship between the device contact surface 30a of the fitting 30 and the fitting contact surface 102a of the acquisition device 100 is described with reference to FIG. 9. FIGS. 9A and 9B are explanatory views of the device contact surface 30a of the fitting 30.

Figure 9A:
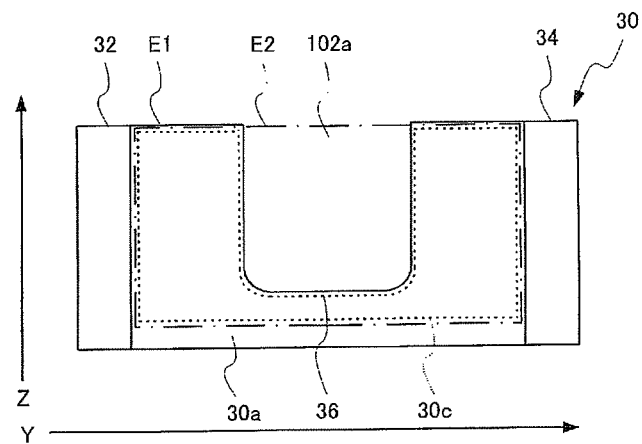
FIGS. 9A and 9B are explanatory views of the device contact surface of a fitting.
Figure 9B:
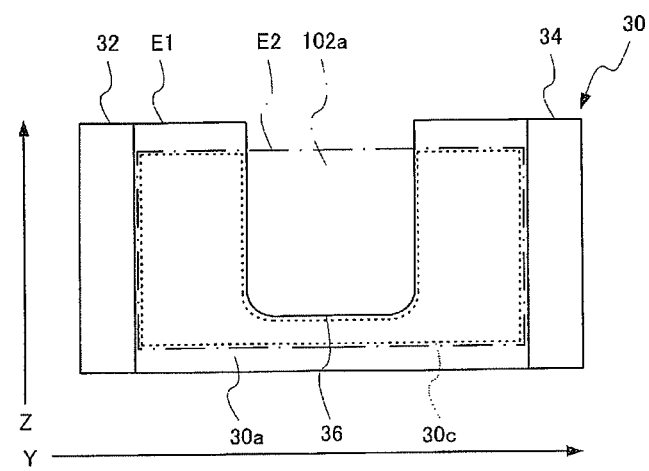

As shown in FIG. 9A, when the acquisition device 100 is installed on the fitting 30, the device contact surface 30a of the fitting 30 contacts the fitting contact surface 102a of the acquisition device 100 (indicated by a chain dotted line in FIGS. 9A and 9B) in the region 30c (indicated by a broken line in FIGS. 9A and 9B). On the other hand, the fitting contact surface 102a of the acquisition device 100 contacts the fitting 30 in the region corresponding to the region 30c.

As shown in FIG. 9A, the outermost end E1 in the wheel radial direction of the device contact surface 30a is provided in a position near the outermost end E2 in the wheel radial direction of the fitting contact surface 102a. Here, near a position in the wheel radial direction is not limited to only the same position in the wheel radial direction, but also includes positions on the inside in the wheel radial direction within that range that the acquisition device 100 does not become an obstruction to the bead portion 3 of the tire 2 when removing the tire 2 from the rim 12. In other words, when removing the tire 2 from the rim 12, provided the acquisition device 100 does not become an obstacle to the bead portion 3 of the tire 2, the outermost end E2 in the wheel radial direction of the fitting contact surface 102a may be provided in a position that is to the outside in the wheel radial direction of the outermost end E1 in the wheel radial direction of the device contact surface 30a (for example, a position about 3 mm to the outside in the wheel radial direction), in other words the acquisition device 100 may be provided projecting into the movement path of the bead portion 3 of the tire 2. In other words, a position near the outermost end E2 in the wheel radial direction is a range from 3 mm to the inside in the wheel radial direction from the outermost end E2 in the wheel radial direction to 3 mm to the outside. Preferably, the position in the wheel radial direction of the outermost end E1 in the wheel radial direction of the device contact surface 30a is within the range of about 3 mm to the inside in the wheel radial direction of the outermost end E2 in the wheel radial direction of the fitting contact surface 102a to a position on the inside in the wheel radial direction of the top of the rim hump 12c. Also, as shown in FIG. 9B, the outermost end E1 in the wheel radial direction of the device contact surface 30a is provided in a position to the outside of the outermost end E2 in the wheel radial direction of the fitting contact surface 102a.

In this way, the acquisition device 100 is configured so that it does not greatly project to the outside in the wheel radial direction from the fitting 30. According to this configuration, when removing the tire 2 from the rim 12, the acquisition device 100 is not an obstacle to the bead portion 3 on the movement path of the bead portion 3 of the tire 2, so the bead portion 3 of the tire 2 does not impact the fitting contact surface 102a of the acquisition device 100. Therefore, it is possible to prevent the acquisition device 100 from being separated from the tire valve 20 or from being damaged due to shock or excessive force caused by impact with the tire 2.

Also, by using the fitting 30 that has been formed so that it can be attached to and removed from the acquisition device 100, it is possible to prevent the acquisition device 100 from being separated from the tire valve 20 or from being damaged, so it is not necessary to change the form of the rim 12 to suit the size of the acquisition device 100 as for example in the conventional case. Therefore, it is possible to maintain the versatility of the wheel 10, and it is possible to minimize the increase in manufacturing cost of the wheel 10.

Figure 10:
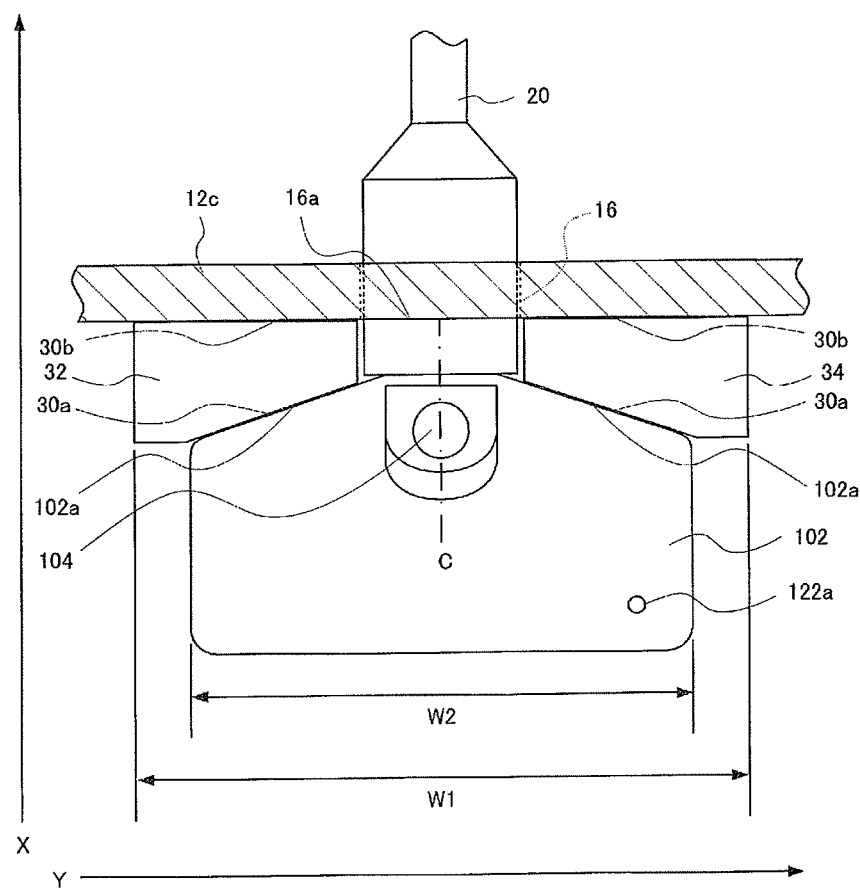
FIG. 10 is a plan view of the acquisition device and fitting.

FIG. 10 is a plan view of the acquisition device 100 and the fitting 30.

As shown in FIG. 10, when the fitting 30 is provided disposed between the acquisition device 100 and the tire valve 20, preferably the first member 32 and the second member 34 are provided one each on either side in the wheel circumferential direction with reference to the central axis (the chain dotted line C in FIG. 10) of the through hole 16. For example, if the fitting 30 is provided on one side only in the wheel circumferential direction with reference to the central axis of the through hole 16, a gap is formed in the wheel width direction between the rim inclined face 12*f* and the acquisition device 100, on the other side in the wheel circumferential direction with reference to the central axis of the through hole 16. In this case, when removing the tire 2 from the rim 12, there is a possibility that the acquisition device 100 will be separated from the tire valve 20 or damaged by the shock or excessive force received when the acquisition device 100 impacts the tire 2, due to impact of the bead portion 3 of the tire 2 entering the gap and impacting the acquisition device 100.

In this embodiment, by providing the first member 32 and the second member 34 on either side in the wheel circumferential direction with reference to the central axis of the through hole 16, it is possible to make the gap in the wheel width direction formed between the rim inclined face 12*f* and the acquisition device 100 small. Therefore, it is possible to prevent the bead portion 3 of the tire 2 from entering the gap and impacting the acquisition device 100 and causing the acquisition device 100 to be separated from the tire valve 20 or damaged.

Also, preferably, the first member 32 and the second member 34 are formed so that they extend in directions away from each other along the wheel circumferential direction from the opening 16*a* of the through hole 16. In this way, it is possible to reduce any gap formed in the wheel width direction between the rim inclined face 12*f* and the acquisition device 100.

As shown in FIG. 10, when the width of the fitting 30 is W1 and the width of the acquisition device 100 is W2, preferably W1 is in the range from 0.5×w2 to 1.5×w2, and more preferably in the range from 0.6×w2 to 1.0×w2.

As described above, according to the wheel 10 and the fitting 30 of this embodiment, when removing the tire 2 from the rim 12, the acquisition device 100 does not obstruct the movement path of the bead portion 3 of the tire 2, so the bead portion 3 of the tire 2 does not impact the acquisition device 100. Therefore, it is possible to prevent the acquisition device 100 from being separated from the tire valve 20 or from being damaged due to shock or excessive force caused by impact with the tire 2.

Also, by using the fitting 30 that has been formed so that it can be attached to and removed from the acquisition device 100, it is not necessary for example to carry out processing to change the form of the rim 12 in accordance with the size of the acquisition device 100. Therefore, it is possible to maintain the versatility of the wheel 10, and it is possible to minimize the increase in manufacturing cost of the wheel 10.

First Modified Example

Next, an example (first modified example) of a fitting 30 that differs from the fitting 30 shown in FIG. 8 is described with reference to FIGS. 11A to 11C.

Figure 11A:
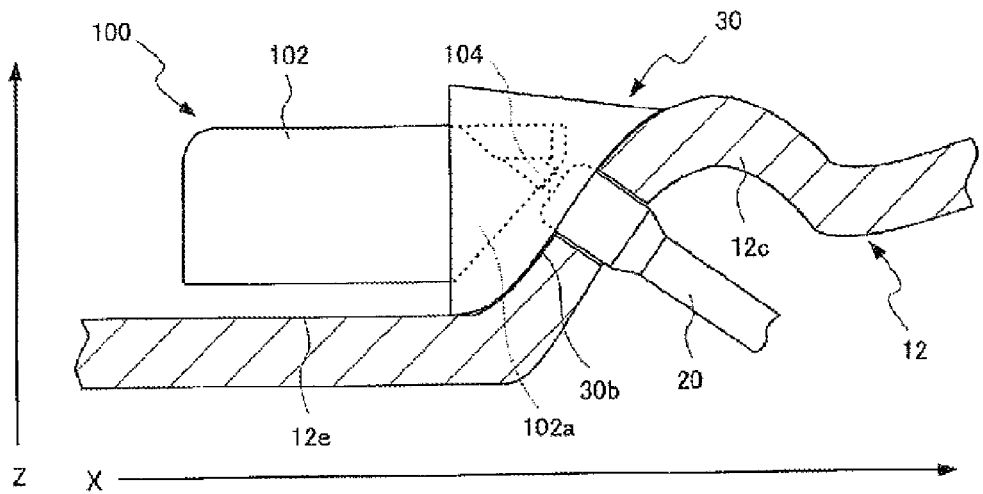
FIGS. 11A to 11C are explanatory views of another example of the fitting shown in FIG. 8.
Figure 11B:
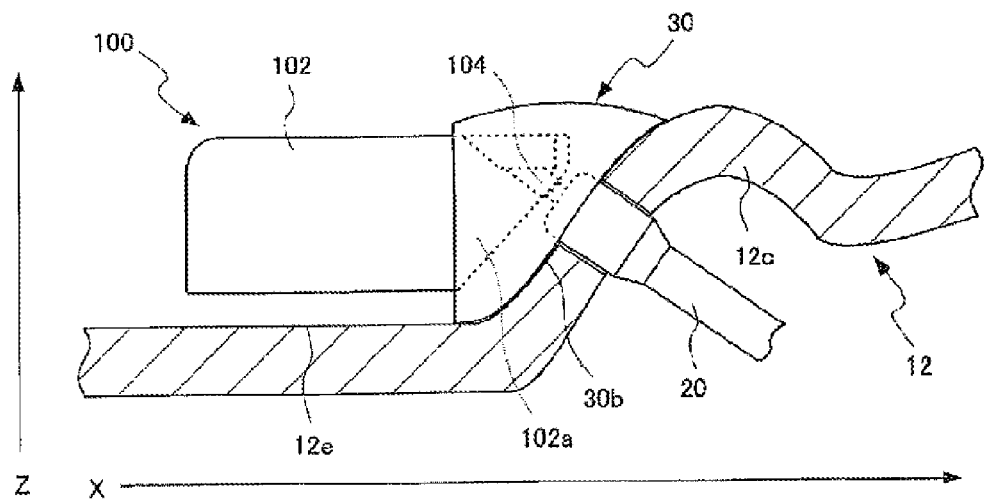

The top surface of the fitting 30, in other words the surface to the outside in the wheel radial direction, may be formed with an incline from the rim inclined face 12*f* towards the acquisition device 100 to the outside in the wheel radial direction, as shown in FIG. 11A, or it may be formed curved to the outside in the wheel radial direction, as shown in FIG. 11B. In both of the cases in FIGS. 11A and 11B, the acquisition device 100 is not an obstacle on the movement path of the bead portion 3 of the tire 2, and it does not interfere with the movement of the bead portion 3. Therefore, when removing the tire 2 from the rim 12, it is possible to prevent the acquisition device 100 from being separated from the tire valve 20 or from being damaged due to shock caused by impact with the tire 2.

Figure 11C:
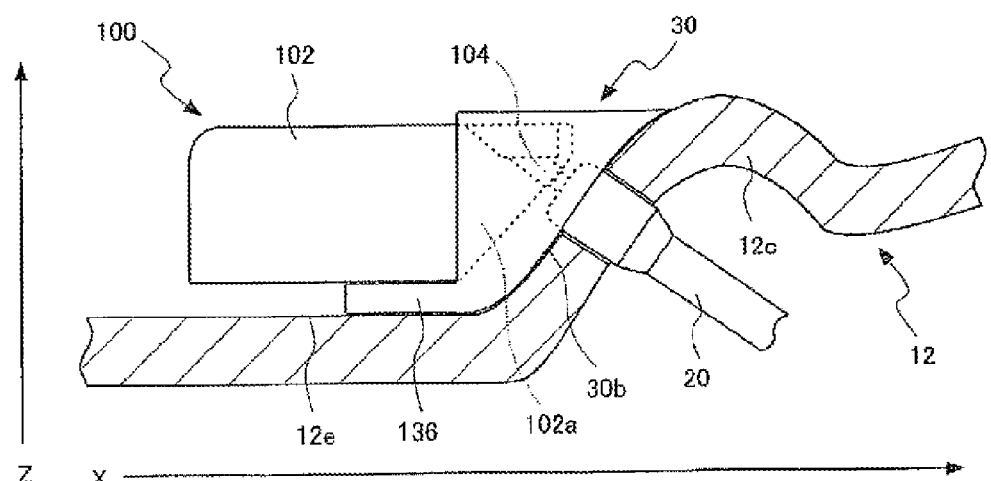

Also, as shown in FIG. 11C, the connecting portion 136 of the fitting 30 may be provided disposed between the bottom surface of the acquisition device 100 and the connecting surface 12*e*. In this case, the acquisition device 100 can be supported by the connecting portion 136, so for example if, when removing the tire 2 from the rim, the bead portion 3 of the tire 2 has risen over the acquisition device 100, it is possible to prevent the acquisition device 100 from being shifted inward in the wheel radial direction by the load from the tire 2.

Second Modified Example

FIG. 12 is an explanatory view of another example of fitting 130 (second modified example) which is different from the above embodiments. The point of difference of the fitting 130 shown in FIG. 12 from the fitting 30 in the above embodiments is that a convex portion 138 that engages in the wheel width direction with a recess portion 112*b* provided on the acquisition device 1100 is provided on the fitting 130.

By forming the fitting 130 and the acquisition device 1100 so that they can engage in the wheel width direction, for example it is possible to restrict the movement of the fitting 130 to the outside in the wheel radial direction due to centrifugal force while the tire is rotating. Also, for example, when removing the tire 2 from the rim 12, when the tire 2 rides over the fitting 130, it is possible to prevent the fitting 130 from being shifted to the inside in the wheel radial direction by the load from the tire 2.

Figure 12A:
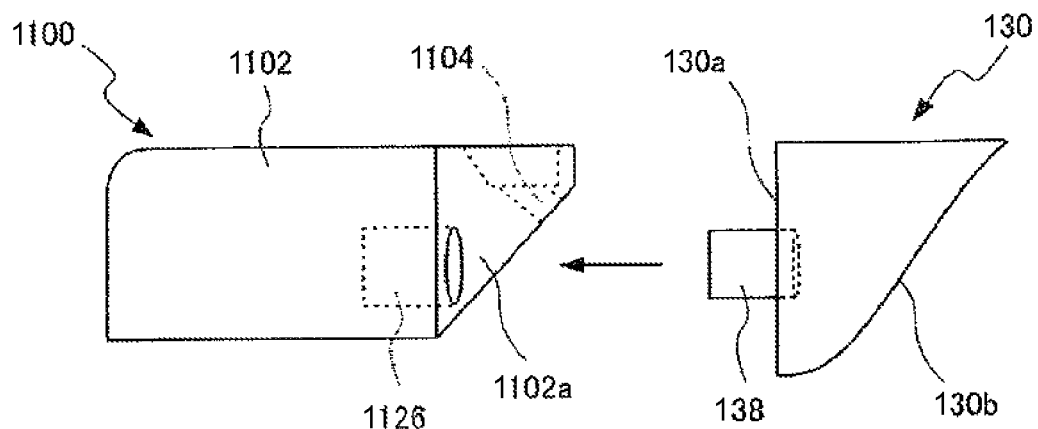
FIGS. 12A and 12B are explanatory views of another example of the fitting shown in FIG. 8.
Figure 12B:
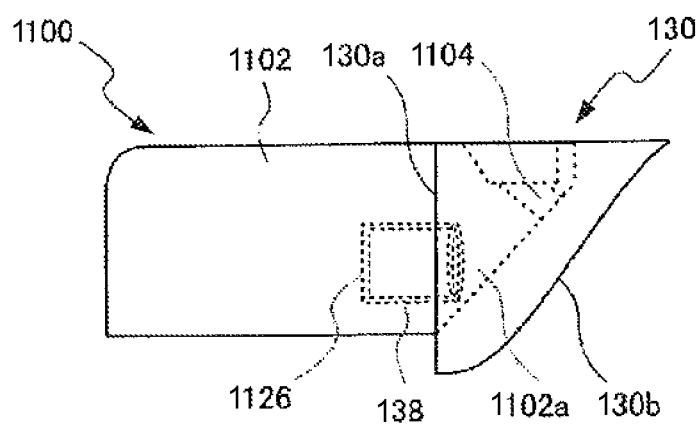
Figure 13A:
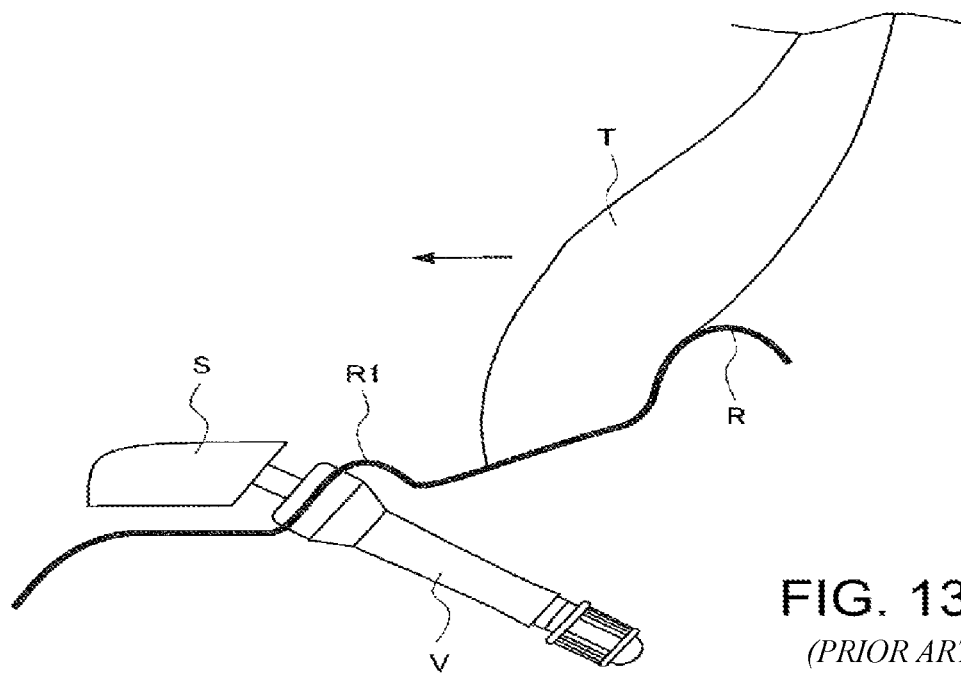
FIGS. 13A and 13B are views explaining the problem in conventional technology when removing the tire from the rim.
Figure 13B:
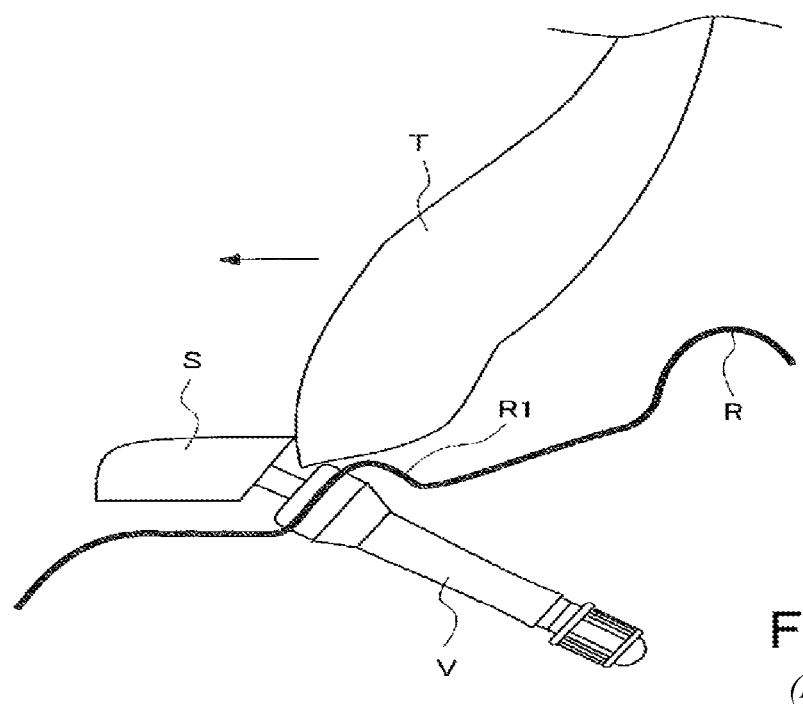

FIGS. 12A and 12B are explanatory views of another example of the fitting 30 shown in FIG. 8. FIG. 12A is a side view of the acquisition device 1100, housing 1102, valve installation hole 1104, and the fitting 130, and FIG. 12B is a side view of the acquisition device 1100 and the fitting 130 when the fitting 130 is engaged with the acquisition device 1100. As shown in FIG. 12A, the convex portion 138 formed so that it projects towards the acquisition device 1100 is provided on the device contact surface 130*a* of the fitting 130. On the other hand, the recess portion 112*b* that is formed so that it can engage with the convex portion 138 is provided on the fitting contact surface 1102*a* of the acquisition device 1100. Also, as shown in FIG. 12B, by inserting the convex portion 138 of the fitting 130 into the recess portion 112*b* of the acquisition device 1100 in the wheel width direction, when the acquisition device 1100 is installed on the fitting 130, movement of the fitting 130 in the wheel radial direction is restricted.

The fitting 130 includes a device contact surface 130*a* on the surface of the fitting 130 facing the acquisition device, and a rim hump contact surface 130*b* that contacts the rim inclined face on the surface of the fitting 130 facing the rim hump. A recess portion may also be provided on the device contact surface 130*a* of the fitting 130, and a convex portion formed so that it can engage with the recess portion may be provided on the fitting contact surface 1102a of the acquisition device 1100. Also, the form of the convex portion and the recess portion may be set as desired.

A recess portion may also be provided on the device contact surface 30a of the fitting 30, and a convex portion formed so that it can engage with the recess portion may be provided on the fitting contact surface 102a of the acquisition device 100. Also, the form of the convex portion and the recess portion may be set as desired.

The vehicle wheel and the fitting for a tire information acquisition device according to the present technology were described in detail above. However, it should be understood that the vehicle wheel and the fitting for a tire information acquisition device according to the present technology are not limited to the above embodiments, and may be improved or modified in various ways within the scope of the present technology.

The invention claimed is:

1. A vehicle wheel, comprising:
    a rim including
        a rim hump extending in a wheel radial direction and protruding to an outside in a wheel radial direction, the rim hump including
            a rim inclined face slanted to an inside in the wheel radial direction on an inside in a wheel width direction from a top of the rim hump, the rim inclined face having an opening of a through hole;
    a tire valve inserted into the through hole;
    a tire information acquisition device installed on the tire valve in a tire cavity region between the rim and a tire fitted on the rim, the tire information acquisition device configured to acquire tire information on the condition of gas filling the tire cavity region; and
    a fitting provided between the rim inclined face and the tire information acquisition device, the fitting including a device contact surface configured to contact the tire information acquisition device, an outermost end in the wheel radial direction of the device contact surface being provided in a position within a range from 3 mm to the inside from an outermost end of a fitting contact surface of the tire information acquisition device to 3 mm to the outside from the outermost end of the fitting contact surface in the wheel radial direction or to the outside of the outermost end in the wheel radial direction of the fitting contact surface, the fitting contact surface configured to contact the fitting, wherein
    the fitting includes a first member and a second member on opposite sides in the wheel circumferential direction with reference to the central axis of the through hole, the first member and the second member extending along the wheel circumferential direction from the opening of the through hole in directions away from each other,
    each of the first member and the second member includes a rim hump contact surface that contacts the rim inclined face, and
    the outermost end in the wheel radial direction of the rim hump contact surface is provided at a position to the inside in the wheel radial direction of the top of the hump.

2. The vehicle wheel according to claim 1, wherein the rim includes a connecting surface connected to the rim inclined face and is provided on the inside in the wheel width direction with respect to the rim inclined face, and, on the inside in the wheel radial direction with respect to the tire information acquisition device, and the fitting contacts the connecting surface.

3. The vehicle wheel according to claim 2, wherein fitting further includes a connecting portion connecting the first member and the second member in the wheel circumferential direction.

4. The vehicle wheel according to claim 2, wherein the fitting has a convex portion on the device contact surface, the convex portion projecting towards the tire information acquisition device, and the tire information acquisition device has a recess portion that engages with the convex portion.

5. The vehicle wheel according to claim 2, wherein the tire information acquisition device has a convex portion on the fitting contact surface, the convex portion projecting towards the fitting, and the fitting has a recess portion that engages with the convex portion.

6. The vehicle wheel according to claim 2, wherein,
    one of the tire information acquisition device and the fitting has a convex portion projecting towards the other, and
    the other has a recess portion configured to engage with the convex portion.

7. The vehicle wheel according to claim 1, wherein the fitting includes a rim hump contact surface that contacts the rim inclined face, and
    the outermost end in the wheel radial direction of the rim hump contact surface is provided at a position to the inside in the wheel radial direction of the top of the hump.

8. The vehicle wheel according to claim 1, wherein the first member and the second member are integrally formed.

9. The vehicle wheel according to claim 1, wherein
    one of the tire information acquisition device and the fitting has a convex portion protruding towards the other, and
    the other has a recess portion configured to engage with the convex portion.

10. The vehicle wheel according to claim 1, wherein the rim complies with ISO 4209-2.

11. A fitting for a tire information acquisition device, the fitting configured to be provided between a rim and the tire information acquisition device,
    the rim including a rim hump extending in a wheel circumferential direction and protruding to an outside in a wheel radial direction, the rim hump including
        a rim inclined face slanted to an inside in the wheel radial direction on an inside in a wheel width direction from a top of the rim hump, the rim inclined face having an opening of a through hole,
    the tire information acquisition device installed on a tire valve in a tire cavity region between the rim and a tire fitted on the rim, the tire information acquisition device configured to acquire tire information on the condition of gas filling the tire cavity region,
    the fitting including a device contact surface configured to contact the tire information acquisition device, an outermost end in the wheel radial direction of the device contact surface configured to be provided in a position within a range from 3 mm to the inside from an outermost end of a fitting contact surface of the tire information acquisition device to 3 mm to the outside from the outermost end of the fitting contact surface in the wheel radial direction or to the outside of the outermost end in the wheel radial direction of the fitting contact surface, the fitting contact surface configured to contact the fitting when the fitting is provided between the rim and the tire information acquisition device, wherein
the fitting includes a first member and a second member on opposite sides in the wheel circumferential direction with reference to the central axis of the through hole, the first member and the second member extending along the wheel circumferential direction from the opening of the through hole in directions away from each other,
each of the first member and the second member includes a rim hump contact surface that contacts the rim inclined face, and
the outermost end in the wheel radial direction of the rim hump contact surface is provided at a position to the inside in the wheel radial direction of the top of the hump.

12. A vehicle wheel, comprising:
a rim including a rim hump extending in a wheel circumferential direction and protruding to an outside in a wheel radial direction, the rim hump including
   a rim inclined face slanted to an inside in the wheel radial direction on an inside in a wheel width direction from a top of the rim hump, and
   a through hole having an opening in the rim inclined face;
a tire valve inserted into the through hole;
a tire information acquisition device installed on the tire valve in a tire cavity region between the rim and a tire fitted on the rim, the tire information acquisition device configured to acquire tire information on the condition of gas filling the tire cavity region; and
a fitting provided between the rim inclined face and the tire information acquisition device, the fitting including
a first member and a second member on opposite sides in the wheel circumferential direction with reference to the central axis of the through hole, the first member and the second member extending along the wheel circumferential direction from the opening of the through hole in directions away from each other, wherein
each of the first member and the second member includes a rim hump contact surface that contacts the rim inclined face, and
an outermost end in the wheel radial direction of the rim hump contact surface is provided at a position to the inside in the wheel radial direction of the top of the hump.

13. The vehicle wheel according to claim 12, wherein
each of the first member and the second member has a device contact surface configured to contact the tire information acquisition device,
an outermost end in the wheel radial direction of the device contact surface is configured to be provided to the outside of an outermost end in the wheel radial direction of a fitting contact surface of the tire information acquisition device, the fitting contact surface configured to contact the fitting.

14. The vehicle wheel according to claim 12, wherein the fitting further includes a connecting portion connecting the first member and the second member in the wheel circumferential direction.

15. The vehicle wheel according to claim 14, wherein
the rim includes a connecting surface connected to the rim inclined face and provided on the inside in the wheel width direction with respect to the rim inclined face, and, on the inside in the wheel radial direction with respect to the tire information acquisition device, and
the connecting portion contacts the connecting surface.

* * * * *